United States Patent
White (10) Patent No.: US 8,943,536 B2
(45) Date of Patent: Jan. 27, 2015

(54) COMMUNITY CONTENT RATINGS SYSTEM

(75) Inventor: Scott Anthony White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1025 days.

(21) Appl. No.: 12/118,355

(22) Filed: May 9, 2008

(65) Prior Publication Data

US 2009/0282438 A1 Nov. 12, 2009

(51) Int. Cl.
*H04N 5/445* (2011.01)
*G06F 3/00* (2006.01)
*G06F 13/00* (2006.01)
*G06Q 30/02* (2012.01)

(52) U.S. Cl.
CPC .................................... *G06Q 30/02* (2013.01)
USPC ........................................................ 725/44

(58) Field of Classification Search
USPC .............................................. 725/42, 44, 60
See application file for complete search history.

(56) References Cited

U.S. PATENT DOCUMENTS

| | | | |
|---|---|---|---|
| 5,973,683 A * | 10/1999 | Cragun et al. ................ 715/719 |
| 6,317,881 B1 * | 11/2001 | Shah-Nazaroff et al. ....... 725/24 |
| 6,374,290 B1 | 4/2002 | Scharber et al. |
| 7,296,285 B1 * | 11/2007 | Jun et al. ......................... 725/46 |
| 2001/0023401 A1 * | 9/2001 | Weishut et al. ................... 705/1 |
| 2005/0066357 A1 | 3/2005 | Ryal |
| 2006/0288041 A1 * | 12/2006 | Plastina et al. ............ 707/104.1 |
| 2007/0204287 A1 | 8/2007 | Conradt et al. |
| 2008/0127241 A1 * | 5/2008 | Garcea ............................ 725/24 |

* cited by examiner

*Primary Examiner* — John Schnurr
*Assistant Examiner* — Christine Kurien
(74) *Attorney, Agent, or Firm* — Jackson Walker L.L.P.

(57) ABSTRACT

Community content ratings are provided to users for one or more multimedia programs. The community content ratings are generated from appropriateness data collected from members of one or more community groups. The members of the community groups may be selected automatically based on stored profiles that include demographic data. Alternatively, community group membership may occur by choice and at the request of potential members. The community content ratings may be presented using appropriateness indicators (e.g., checkmarks or numerical scores) that are presented to a user in response to the user selecting the multimedia program from an electronic programming guide.

17 Claims, 4 Drawing Sheets

COMMUNITY CONTENT RATINGS SYSTEM

BACKGROUND

1. Field of the Disclosure

The present disclosure generally relates to distribution of digital television content and more particularly to community-based rating systems that collect and distribute information regarding the suitability or appropriateness of multimedia programs.

2. Description of the Related Art

Standardized systems exist for rating motion pictures, music, and other multimedia content according to the suitability of the multimedia content for certain audiences (e.g., children, teenagers, and adults). For example, the Motion Picture Association of America (MPAA) rates motion pictures as either G, PG, PG-13, NC17, or R.

DESCRIPTION OF THE EMBODIMENT(S)

In one aspect, an embodied service provides a user with appropriateness data for multimedia programs. The service includes collecting appropriateness data for a multimedia program from a plurality of members. A portion of the plurality of members is associated with a community group. The service further includes presenting to the user an appropriateness indicator that is based on the appropriateness data. The appropriateness indicator is presented to the user in response to the user selecting a representation of the multimedia program from an electronic programming guide. The user may also be associated with the community group as a community group member. The appropriateness data may include ratings for sub-portions (e.g., chapters, scenes, or frames) of the multimedia program. Examples of appropriateness indicators that may be presented to users include: a non-numeric graphical symbol, a numeral that is based on an average rating of a portion of the plurality of members, an indicator with a numeral portion in conjunction with a graphical portion, and a numeral based on a comparison against the appropriateness indicators of other multimedia programs.

In another aspect, an embodied method collects appropriateness data and provides appropriateness indicators for multimedia programs. The method includes collecting appropriateness data from a plurality of members for a multimedia program. The method further includes collecting grouping data from a portion of the members. The grouping data, for example, may be demographic data stored in member profiles. The method also includes presenting at least one appropriateness indicator to a user in response to the user selecting a representation of the multimedia program from an electronic programming guide. The appropriateness indicator may be based on the appropriateness data and may include one of a plurality of colors that each indicate a degree of appropriateness for the multimedia program.

In still another aspect, an embodied application server is enabled by computer instructions stored on one or more machine-readable media. The instructions receive appropriateness data for a multimedia program from community group members. Further instructions deliver an appropriateness indicator to a user in response to the user selecting a representation of the multimedia program from an electronic programming guide. The appropriateness indicator is based on the appropriateness data collected from the community group members. Further instructions may scan a plurality of member profiles for appropriateness data and for demographic data used to classify members. Individual profiles are associated with individual members from the plurality of members. Further instructions categorize a portion of the members into community groups based on similar stored data (e.g., demographic data) within the profiles.

The following description includes examples and details to enable one of ordinary skill in the art to practice the claimed subject matter without undue experimentation. It should be apparent to a person of ordinary skill that disclosed embodiments are included as examples and not exhaustive of all possible embodiments. Regarding reference numerals used to describe some elements in the figures, a hyphenated form of a reference numeral refers to a specific instance of an element and the un-hyphenated form of the reference numeral refers to the element generically or collectively. Thus, for example, "set-top box 121-1" refers to an instance of a set-top box. Accordingly, multiple set-top boxes may be referred to collectively as "set-top boxes 121" or "STBs 121." In addition, using this numbering convention, a single set-top box may be referred to more generically as "set-top box 121" or "STB 121."

An example embodiment allows users (e.g., community group members) of managed interactive entertainment services, such as interactive TV or broadband personal computer (PC) entertainment services, to input content ratings (e.g., appropriateness data) for multimedia content they have viewed, listened to, or otherwise consumed. Such systems are designed to accumulate and distribute data within a community or group regarding the suitability of multimedia programs for particular audiences. Previous standardized ratings systems may, for example, rate a movie as suitable for "mature audiences" due to some combination of nudity, violence, or language. However, many mature adults may not wish to view certain content rated for mature audiences. For example, some adults may dislike movies that deal with violence while others have an extreme aversion to vulgar language or nudity. Disclosed embodiments provide community-based ratings systems for collecting appropriateness data from community group members and providing appropriateness indicators (i.e., ratings) to users to allow the users to determine the suitability of multimedia programs.

In some embodiments, accumulated data optionally may be provided, adjusted, or grouped based on demographic or geographic information. Ratings may be accumulated, stored, tracked, or provided based on age, location, and education level, as examples. Data may be associated by location information including whether the data corresponds to a household, block, zip code, city, state, region, or country. In other words, a user may request and receive ratings information for everyone in his or her zip code. In addition, other affiliations such as political preferences may be associated with accumulated data.

An example embodiment presents community-based ratings in addition to industry-standard ratings (e.g., from the MPAA). In addition, disclosed embodiments may be provisioned to exercise parental control over viewed content based on the community-based ratings. For example, an administrator or parent may block a child's access to any movie or program in which community-based data indicates that 75% of users feel the movie is inappropriate for a person under 12 years of age.

Certain ratings systems are considered biased because they rely on self-imposed ratings. For example, the motion picture, television and music industries, use ratings systems that are influenced by those affected by the ratings. In the music industry, the Recording Industry Association of America (RIAA) marks some content as having explicit lyrics. Some consumers feel that such ratings systems are potentially faulty because there is a possibility that ratings are influenced by the entities that are controlled by the ratings. In addition, such ratings systems are generally applied by entertainment professionals residing in areas whose prevailing values may not coincide with those in some parts of the country. In other words, Hollywood values may not coincide with values in Lexington, Ky. In addition, there may be inconsistencies with the manner in which such ratings systems are applied over time. In other words, movies with content that would have qualified as "R" a decade ago are "PG-13" today. Further, ratings have been observed to be flexible based on the expected marketing impact of the content (i.e., a motion picture adapted from a popular science fiction book may be packed with beheadings, amputations and other explicit violence, while still garnering a PG-13 rating).

Aggregate preferences regarding content may be highly regionalized. For example, many communities are, in aggregate, more comfortable with sex scenes than depictions of intense violence. On average, members of other regions may be less comfortable with sexual content, but may allow their children to consume violent content. Therefore, the "one-size-fits-all" systems implemented by entertainment professionals may be inadequate compared to disclosed embodiments that accumulate and provide community-based ratings.

An example embodiment is a system whereby customers of managed entertainment products can rate the appropriateness of entertainment media provided through that network. The ratings may be aggregated into an average profile for one or more communities or groups to which the customers belong. This data can then be used to provide region specific or community specific ratings for a multimedia program.

A number of input methods by which members can provide appropriateness data may be employed, ranging from a simple system of graphics-based topical sliders or stars (e.g., rate this title for violence, language and sexual content) to a flag button on the remote control where community group members can mark individual on-screen instances (e.g., frames, scenes, or chapters). Interfaces for providing appropriateness data may span multiple entertainment consumption platforms (e.g., set-top boxes and PC media extenders, etc.) served by a service provider. Once the data is collected, it can be processed to consider additional factors, such as the demographic information (e.g., age) of populations who rated the content. Other factors such as the fact that people rating the content may be the ones dissatisfied with it, while the ones who liked it may not rate it at all, may be considered.

The weighted data may then be served back to users by means of community ratings (e.g., an appropriateness indicator) presented in conjunction with the content, apprising the user of how his or her community or group generally felt about the appropriateness of the multimedia program's content. These community ratings may likewise be used to drive parental controls services. Interfaces may be provided so users can affiliate themselves with certain demographic groups (such as a religion) or self-selected communities (my school or my friends list), which can further tailor the community ratings and ratings-based services presented to the user.

In some embodiments, appropriateness data is sold back to content owners so the content owners can more effectively market their products. For example, an Internet protocol television (IPTV) system may test an upcoming movie or TV release and gain data for refining the program prior to general release.

An example embodiment allows users to utilize media ratings provided by people likely to share similar values. Users may benefit from ratings provided by communities or groups such as a neighborhood, city, region, religious affiliation, and so on. This allows users to utilize data not from suspect sources, but from trusted communities with which they identify. A service provider may benefit from such systems by being able to promote a service which utilizes the power of end-to-end managed communications over broadband to bring users a richer and more innovative service that is more tailored to the user's needs. Further, service providers may sell this data back to content owners, enabling the owners to make more educated content distribution decisions.

Disclosed embodiments relate to ratings systems for television programs, video-on-demand ("VOD") programs, radio programs, and a variety of other multimedia content forms. Suitable types of networks that may be provisioned for distribution and delivery of such multimedia content include, as examples, telephony-based networks, coaxial-based networks, satellite-based networks, and the like. In some networks that may include, for example, traditional coaxial-based "cable" networks, a service provider distributes a mixed signal that may include a relatively large number of multimedia content channels. Each channel may be transmitted at a different frequency band (i.e., channel), through a coaxial cable, a fiber-optic cable, or a combination of these and potentially other cables or wireless media. The enormous bandwidth required to transport simultaneously large numbers of multimedia channels is a source of constant challenge for cable-based providers. In these types of networks, a tuner or some form of receiver is required to select a channel from the mixed signal for playing or recording. Accordingly, a user wishing to play or record multiple channels simultaneously may need distinct tuners for each desired channel. This is an inherent limitation of cable networks and other mixed signal networks.

In contrast to mixed signal networks, IPTV networks generally distribute content to a user only in response to user requests. Therefore, at any given time, the number of content channels provided to the user is relatively small. For example, a user may simultaneously receive one or more multimedia streams that contain one channel for viewing and possibly one or more channels for recording during viewing of the first channel. As suggested by the name, IPTV networks typically employ IP and other open, mature, and pervasive networking technologies. During transmission, rather than requiring the use of a particular frequency band, an IPTV television program, movie, or other form of multimedia content is a digital, packet-based stream that corresponds to a particular network address (e.g., an IP address). In such networks, the concept of a channel is inherently distinct from the frequency channels native to mixed signal networks. Moreover, whereas a mixed signal network may require a hardware-intensive tuner for every channel to be played, IPTV channels can be "tuned" simply by transmitting a request (e.g., a universal resource locator (URL) request) to a server.

To transmit multimedia content, IPTV service providers may utilize existing infrastructure such as existing telephone lines. In addition, within a user's site (e.g., home or office), an IPTV service provider may utilize customer premise equipment (CPE) a residential gateway (RG), digital subscriber line (DSL) modem, or other equipment that be enabled for receiving multimedia content and data from the provider network. Such CPE may include set-top boxes (STBs), displays, and other appropriate equipment for converting the received multimedia content into usable form. In some implementations, a core portion of an IPTV network is implemented with fiber optic cables while the so-called "last mile" may include conventional, unshielded, twisted-pair, copper cables (e.g., traditional telephone lines).

Typical IPTV networks support bidirectional (i.e., two-way) communication between a user's CPE and the content provider's equipment. Bidirectional communication allows the content provider (i.e., "service provider") to deploy advanced features, such as VOD, pay-per-view, electronic programming guides ("EPGs"), and the like. Bidirectional networks may also enable a service provider to collect information related to a user's preferences, viewing habits and the like. In accordance with disclosed embodiments, bidirectional communication permits a user to provide and request appropriateness data related to the multimedia programs. The bidirectional nature of the IPTV network also allows software applications related to the control of multimedia access to be network-based. In addition, communication between STBs over the provider network is permitted due to the bidirectional nature of an IPTV provider network. In this way, for example, a parent in one room may manipulate an STB in another room (e.g., a child's room) to adjust parental controls based on appropriateness data.

Figure 1:
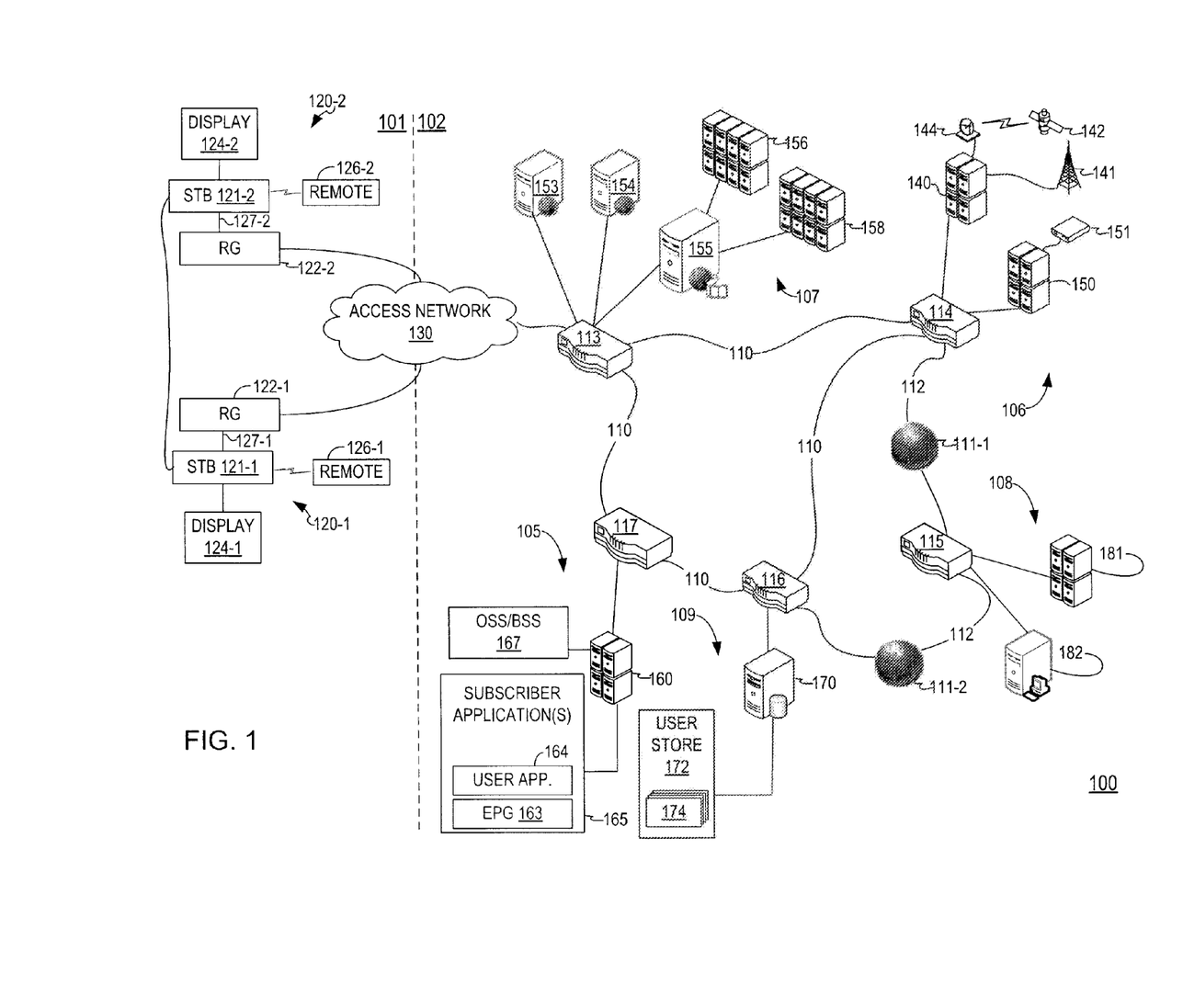
FIG. 1 depicts an example provider network for collecting appropriateness data from community group members and providing appropriateness indicators to users in accordance with disclosed embodiments.

Additional details of embodied systems and methods are included in the attached drawings. FIG. 1 depicts selected aspects of a multimedia content distribution network (MCDN) 100. MCDN 100 is a provider network that, as shown, may be divided into a client side 101 and a service provider side 102 (a.k.a. server side 102). The client side 101 includes all or most of the resources depicted to the left of access network 130 while the server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical wires that connect a user's home or business to a local exchange. In these embodiments, the physical layer of access network 130 may include twisted pair copper cables or fiber optics cables employed as either fiber to the curb (FTTC) or fiber to the home (FTTH).

Access network 130 may include hardware and firmware to perform signal translation when access network 130 includes multiple types of physical media. For example, an access network that includes twisted-pair telephone lines to deliver multimedia content to users may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

In other embodiments, access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100 private network 110 includes a hierarchy of VHOs.

A national VHO may deliver national content feeds to several regional VHOs. In turn, each regional VHO may include its own acquisition resources to acquire local content, such as from the local affiliate of a national network, and to inject the local content into the feeds. The regional VHOs may then deliver the local and national content for reception by users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

As shown in FIG. 1, segments of private network 110 are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls (not depicted) that maintain the security and privacy of network 110. Other portions of MCDN 100 communicate over a public network 112, including, for example, the Internet or other type of web network where the public network 112 is signified in FIG. 1 by the World Wide Web icons 111.

As shown in FIG. 1, the client side 101 of MCDN 100 depicts two of a potentially large number of client-side resources referred to herein simply as client(s) 120. Each client 120, as shown, includes an STB 121, an RG 122, a display 124, and a remote control device 126. Clients 120 may be in different user sites, for examples houses that are in different cities.

As shown in FIG. 1, RGs 122 may include elements of broadband modems (e.g., DSL modems), as well as elements of Ethernet-compliant routers and/or access points that are suitable for communication over local area networks (LANs) 127. In some embodiments, STBs 121 may be uniquely addressable Ethernet compliant devices. In the embodiment depicted in FIG. 1, remote control device 126 communicates wirelessly with STB 121 using an infrared (IR) or RF signal. Display 124 may include any form of conventional frequency tuner and may contain all or part of the functionality and circuitry of RG 122 and STB 121.

In IPTV-compliant implementations of MCDN 100, clients 120 are operable to receive packet-based multimedia streams from access network 130 and process the streams for presentation on displays 124. In addition, clients 120 are network-aware systems that may facilitate bidirectional-networked communications with server side 102 resources to facilitate network-hosted services and features such as collecting and providing appropriateness data. Because clients 120 are operable to process multimedia content streams while simultaneously supporting more traditional web-like communications, clients 120 may support or comply with a variety of different types of network protocols including streaming protocols such as reliable datagram protocol (RDP) over user datagram protocol Internet protocol (UDP/IP) and web protocols such as hypertext transport protocol (HTTP) over transport control protocol IP (TCP/IP). The depiction in FIG. 1 of server side 102 emphasizes network capabilities including application resources 105, content acquisition resources 106, content delivery resources 107, and OSS/BSS resources 108. One or more of these resources may have access to database resources 109.

Before distributing multimedia content to viewers, MCDN 100 first obtains multimedia content from content providers. To that end, acquisition resources 106 encompass various systems and devices to acquire multimedia content, reformat it when necessary or desired, and process it for delivery to users over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down-linked signals transmitted by a satellite 142 and received by parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 transmits acquired content over private network 110, for example, to one or more servers in content delivery resources 107. Prior to transmission, live acquisition server 140 may encode acquired content using, for example, MPEG-2, H.263, a Windows Media Video (WMV) family codec, or another suitable video codec. Acquired content may be encoded and composed to preserve network bandwidth and network storage resources and, optionally, to provide encryption for securing the content. VOD content acquired by VOD acquisition server 150 may be in a compressed format prior to acquisition and further compression or formatting prior to transmission may be unnecessary.

Content delivery resources 107 as shown in FIG. 1 are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server may be referred to as time-shifted content to emphasize the ability to obtain and view VOD content substantially without regard to the time of day or the day of week.

Content delivery server 155, in conjunction with live content server 156 and VOD delivery server 158, responds to viewer requests for content by providing the requested content to the viewer. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content in one or more packet headers according to the network communication protocol stack in use. These data packets are then transmitted across a network to a receiver (e.g., STB 121 of client 120), where the content is parsed from individual packets and re-assembled into multimedia content suitable for processing by a STB decoder.

Viewer requests received by content delivery server 155 may include an indication of the content that is being requested. In some embodiments, this indication includes an IP address associated with the desired content. For example, a particular local broadcast television station may be associated with a particular channel and the feed for that channel may be associated with a particular IP address. When a user wishes to view the station, the user may interact with remote control device 126 to send a signal to STB 121 indicating a request for the particular channel. When STB 121 responds to the remote control signal, the STB 121 changes to the requested channel by transmitting a request that includes an IP address associated with the desired channel to content delivery server 155.

Content delivery server 155 may respond to a request for content by making a streaming video signal accessible to STB 121 for conversion into usable form by display 124. Content delivery server 155 may employ unicast and broadcast techniques when making content available to a viewer. In the case of multicast, content delivery server 155 employs a multicast protocol to deliver a single originating stream to multiple clients. When a new user requests the content associated with a multicast stream, there may be latency associated with updating the multicast information to reflect the new viewer as a part of the multicast group. To avoid exposing this undesirable latency to the user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101 and server side 102. Client-facing switch 113, as shown, is so-named because it connects directly to the client 120 via access network 130 and it provides the network connectivity of IPTV services to users' locations.

To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including real-time transport protocol (RTP), real-time control protocol (RTCP), file transfer protocol (FTP), and real-time streaming protocol (RTSP).

In some embodiments, client-facing switch 113 routes multimedia content encapsulated into IP packets over access network 130. For example, an MPEG-2 transport stream may be sent, in which the transport stream consists of a series of 188-byte transport packets. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide user access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies user information by communicating with user store 172 via the private network 110. Client gateway 153 may verify billing information and user status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming user and/or billing information, client gateway 153 may allow STB 121 access to IPTV content, VOD content, and other services. If client gateway 153 cannot verify user information for STB 121, for example, because it is connected to an unauthorized twisted pair or RG, client gateway 153 may block transmissions to and from STB 121 beyond the private access network 130.

MCDN 100, as depicted, includes application resources 105, which communicate with private network 110 via application switch 117. Application resources 105 as shown include an application server 160 operable to host or otherwise facilitate one or more subscriber applications 165 that may be made available to system users. For example, subscriber applications 165 as shown include an EPG application 163. Subscriber applications 165 may include other applications including user applications 164. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

As shown in FIG. 1, application server 160 hosts a generic application referenced as user application 164. User application 164 represents any application that may deliver a value-added feature to a subscriber or non-subscribing user. User application 164 is illustrated in FIG. 1 to emphasize the ability to extend the network's capabilities by implementing one or more networked-hosted applications. Because the application resides on the network, it generally does not impose any significant computing requirements on local devices or imply any substantial modifications to the client 120 including the STB 121. In some instances, an STB 121 may require knowledge of a network address associated with user application 164, but STB 121 and the other components of client 120 are largely unaffected. Accordingly, STBs that are not locally networked together may exchange information through user application 164 or may share information that is processed by one or more applications such as user application 164.

In accordance with disclosed embodiments, user application 164 may include software modules for collecting appropriateness data from community group members and providing appropriateness indicators to users in accordance with user preferences. Alternatively, parts of the software modules may reside on devices such as STBs 121.

Additional elements shown in FIG. 1 include database switch 116, which is connected to applications switch 117 and provides access to database resources 109. Database resources 109 include a database server 170 that manages a system storage resource 172, also referred to herein as user store 172. User store 172, as shown, includes one or more user profiles 174 where each user profile includes account information and may include preferences information that may be retrieved by applications executing on application server 160 including subscriber application 165. MCDN 100, as shown, includes an OSS/BSS resource 108 including an OSS/BSS switch 115. OSS/BSS switch 115 facilitates communication between OSS/BSS resources 108 via public network 112. The OSS/BSS switch 115 is coupled to an OSS/BSS server 181 that hosts operations support services including remote management via a management server 182. OSS/BSS resources 108 may include a monitor server (not depicted) that monitors network devices within or coupled to MCDN 100 via, for example, a simple network management protocol (SNMP).

In accordance with disclosed embodiments, MCDN 100 provides a service in which a user receives one or more appropriateness indicators regarding multimedia programs. The appropriateness indicators are based on appropriateness data collected from community group members, which may be subscribers to related services provided by MCDN 100. Localized components identical to or similar to STBs 121 may collect appropriateness data for one or more multimedia programs. In addition, network-based systems may participate in the collection of appropriateness data from community group members and may participate in the presentation of appropriateness indicators that are based on the data. For example, application server 160 may be enabled for such operations by machine-readable instructions stored on one or more computer readable media. In operation, a user may scroll down an EPG, presented on display 124-2 for example, to view available multimedia programs (e.g., television shows or pay-per-view movies). The EPG may have a graphical user interface that allows a user to select from a plurality of community groups from which the user wishes to receive appropriateness data. For example, the user may request that appropriateness data from the user's family be used in deriving or calculating the appropriateness indicators displayed in the EPG. In the alternative, multiple community groups may be used for deriving one or more sets of appropriateness data.

Upon the user selecting a multimedia program, the embodied service presents at least one appropriateness indicator that is based on the appropriateness data. The act of selecting a multimedia program or a representation of a multimedia program may include scrolling down a list of multimedia programs presented on the EPG. The representation of the multimedia program may be an icon, an abbreviation, a photographic image, a movie clip with video content, an area of the EPG that contains the title of the multimedia program, or some other form of identifier commonly presented by EPGs. Examples of appropriateness indicators include a numerical score, a color-based representation in which red indicates objectionable content while green represents no objectionable content, a letter-based grade system similar to those commonly used in schools, or a graphics-based system with highlighted objects such as stars or check marks that are appropriately filled in accordance with a rating. For example, a rating of 5 out of 10 would result in a graphical indicator showing five filled stars and five empty stars. The appropriateness indicator may rank the multimedia program on a percentile basis within a community group. Accordingly, a multimedia program may be in the top $10^{th}$ percentile for having violent content. In some embodiments, additional detail may be given and a program may be rated compared to all other multimedia programs rated by one or more community groups (e.g., 417th out of 5678 for violent content). The above examples are provided for illustration purposes and other appropriateness indicators may be provided within the scope of the claimed subject matter.

In accordance with some embodiments, a user may select one or more community groups from which to draw appropriateness data used in deriving appropriateness indicators. The user may be but does not have to be a member of the community group from which the appropriateness data is drawn. For example, a user may belong to a community group entitled "Republicans," but may wish to view the appropriateness of a multimedia program as ranked by members of a "Democrats" community group.

MCDN 100 may stored group affiliation for members and users within user profiles 174. A user may provide user input to local set-top box (e.g., STB 121-2) through a remote control device (e.g., remote-control device 126-2) to associate the user with one or more community groups. Accordingly, in response to user inputs to join a particular community group, a profile for the user (e.g., a profile stored in user profiles 174) may be populated with data that determines the user's community group affiliations. User profiles 174 may also include demographic data for members. In some embodiments, user application 164, or an application running on STB 121, may access stored demographic data and automatically categorize members according to the demographic data. For example, a user may request appropriateness data for all members over 25 years of age. Using stored demographic data that is associated with user profiles, an embodied system would retrieve and compile appropriateness data from such members. Other demographic data may relate to occupation, income, race, educational attainment, location, religion, or political affiliation, as examples. The demographic data may also include ownership data, such as whether the member owns a car, home, pet, or the like.

Some embodied services and systems allow users to receive appropriateness data for entire multimedia programs. As an additional feature, some embodied systems and services allow for members and users to provide appropriateness data for individual scenes or chapters of a multimedia program. For example, chapters of a movie may be graded by members according to nudity content, violent content, language content, and the like. Appropriateness data used in grading the movie may be presented by members of a community group for one or more chapters within the movie. Such a feature may be used to flag certain objectionable portions of a multimedia program. The user may then access the appropriateness indicators that are generated for the movie from the appropriateness data from the community group members. The appropriateness indicators may be chapter specific or may be averaged to provide an overall "score" for a movie. Alternatively, a user may be presented with the highest and lowest score that is derived from the appropriateness data provided by the community group members. Some embodied systems may be associated with parental controls. Accordingly, a user may set parental controls to prevent a child from viewing any content that has been rated by certain community groups to be inappropriate. In some embodiments, sub-portions of a multimedia program may be graded. For example the multimedia program may be graded on a per-chapter, per-scene, or per-frame basis. Frames, chapters, scenes, or entire programs that are objectionable or inappropriate as graded by community group members may be excluded according to parental control settings.

Figure 2:
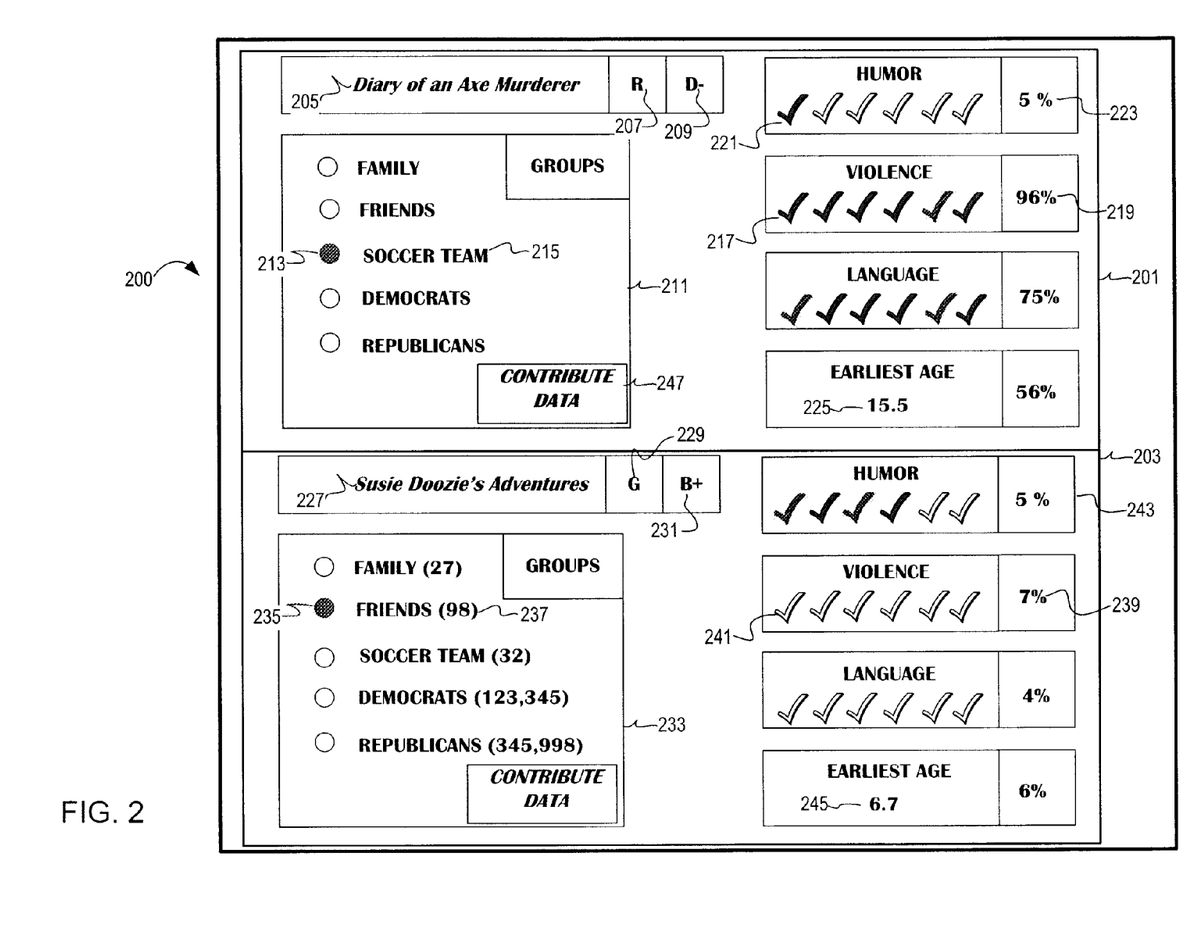
FIG. 2 depicts an electronic programming guide with a graphical user interface for presenting, in accordance with disclosed embodiments, appropriateness indicators related to multimedia programs.

FIG. 2 depicts selected components of graphical user interface (GUI) 200, which may be part of an EPG. As shown, GUI 200 includes entry 201, which provides a user with appropriateness data in accordance with disclosed embodiments. Entry 201 is for a multimedia program entitled "Diary of an Axe Murder" as shown by title 205. Rating 207 is a standardized rating that indicates that the multimedia program has an "R" rating. This standardized "R" rating, which is commonly recognized, may be from a rating organization such as the Motion Picture Association of America. As shown, the multimedia program also has a quality rating 209 of "D-" which indicates that the multimedia program may be of relatively poor quality. As shown, entry 201 provides a user with appropriateness indicators regarding the associated multimedia program. For example, appropriateness indicator 221 is a graphical indicator that includes one highlighted checkmark and five non-highlighted checkmarks. The appropriateness indicator 221 may be derived from appropriateness data gathered from members of one or more community groups. In some embodiments, the community groups are established within the service provider network such as an IPTV network. A user may select from several community groups 211, as shown. In entry 201, community group 215 corresponds to "soccer team" and is shown selected by highlighted icon 213. Appropriateness indicator 221, as shown, includes one highlighted checkmark out of six highlighted checkmarks, which indicates a relatively low grade from community group 215 regarding the level of humor that the multimedia program contains. Appropriateness indicator 223, which as shown is a numeric-based indicator, corresponds to a percentile rating.

As shown, appropriateness indicators for other categories (e.g., violence, language, nudity) may be displayed in entry 201. For example, appropriateness indicator 217 illustrates six highlighted checkmarks out of six available checkmarks. This indicates that the multimedia program has a high-level of violence as graded by the soccer team, which corresponds to community group 215. Appropriateness indicator 219, as shown, ranks the multimedia program in the violence category on a percentile basis compared to all other multimedia programs rated for appropriateness by the soccer team. As shown, the soccer team rates the multimedia program in the top 96 percentile for violence. Appropriateness indicator 219 may be calculated from appropriateness data that the soccer team and other community groups provide over time. As shown, entry 201 also includes appropriateness indicator 225, which indicates the earliest age for viewing as determined by the aggregate of the members of the soccer team corresponding to community group 215. As shown, GUI 200 includes input icon 247 that may be selected by a user to allow the user to grade the multimedia program corresponding to entry 201.

GUI 200 also includes entry 203, which corresponds to the multimedia program entitled "Susie Doozie's Adventures" as shown in title 227. It may be worth noting that the titles of multimedia programs mentioned herein are fabricated. The titles have been chosen to connote a level of "appropriateness" to young audiences, for example, but any similarity to the titles of actual multimedia programs is unintended. Referring again to FIG. 2, the multimedia program for entry 203 includes a standardized rating 229. The "G" designation of rating 229 indicates that the movie may be appropriate for all audiences according to the Motion Picture Association of America. Quality rating 231, which is a B+, indicates that the movie may be of decent quality. Quality rating 231 may be generated from a centralized rating agency or it may be calculated from quality data compiled from members of a particular community group (e.g., friends, family or democrats). As shown, entry 203 includes appropriateness indicator 241, which includes six non-highlighted checkmarks. Appropriateness indicator 241 is based on appropriateness data provided by members of a particular community group (e.g., friends). As shown, community groups 233 include a highlighted icon 235 that corresponds to "friends." As shown, optional quantity indicator 237 indicates there are 98 members in the "friends" community group. Appropriateness indicator 239 represents a percentile ranking of the multimedia program according to the "friends" community group in the violence category. Although the multimedia program has zero out of six check marks for violence, it still ranks in the 7% for violence as shown by appropriateness indicator 239. As shown, appropriateness indicators 243 include highlighted checkmarks (i.e., graphical indicators), non-highlighted checkmarks (i.e., graphical indicators), and a percentile ranking (i.e., a numeral) for the multimedia program in the "humor" category. Appropriateness indicator 245, which is a numeral, corresponds to the earliest age at which the "friends" community group, in the aggregate, feels the multimedia program should be viewed.

Figure 3:
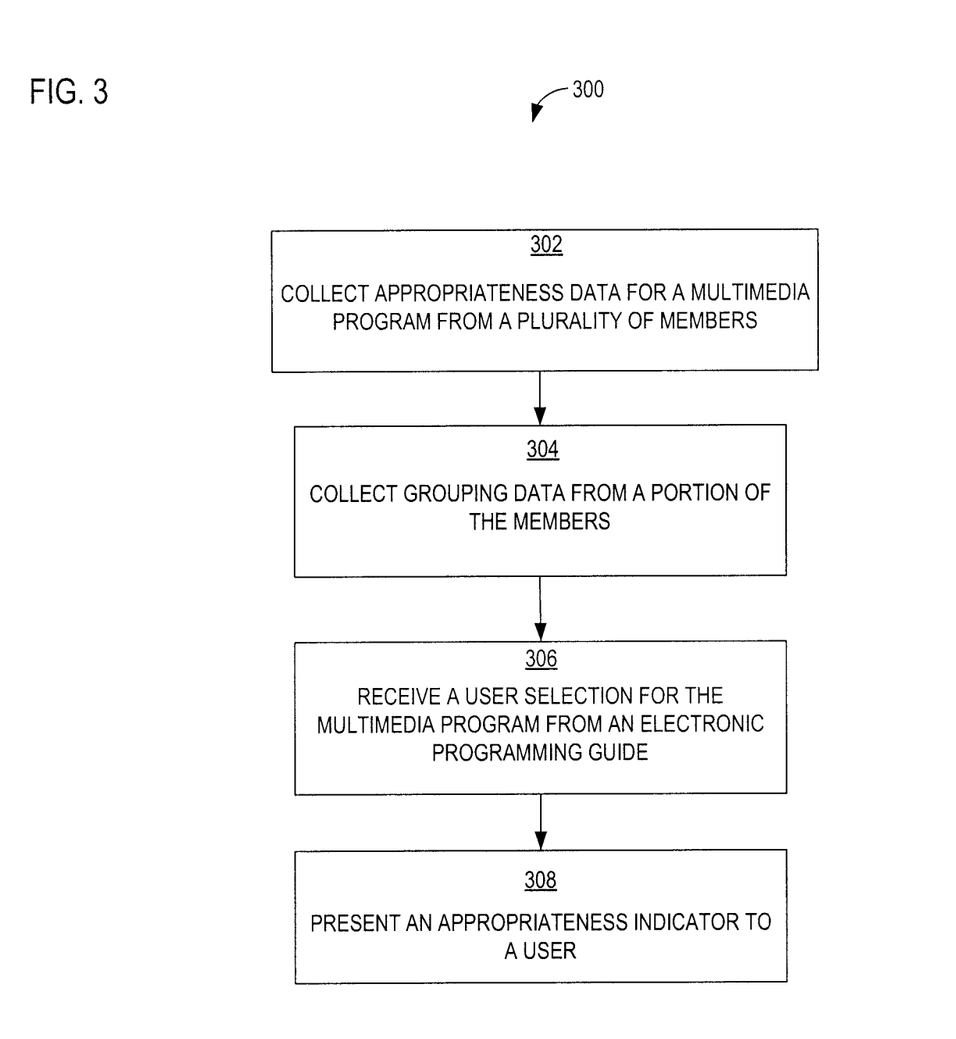
FIG. 3 is a flow diagram with selected operations for collecting appropriateness data from members and providing appropriateness indicators derived from the data to users in accordance with disclosed embodiments.

Referring now to FIG. 3, methodology 300 includes operations 302-308 for collecting appropriateness data for a multimedia program from community group members and presenting to a user appropriateness indicators that are based on the collected data. As shown, operation 302 relates to collecting appropriateness data for the multimedia program from a plurality of members. For example, community group members may score a multimedia program on a 1 to 10 scale for nudity content, language content, violent content, and other similar categories related to appropriateness of the multimedia for particular audiences. The appropriateness data may be provided on a per-program, per-scene, per-chapter or other such basis. Operation 304 relates to collecting grouping data from a portion of the members. Grouping data may be based on member-provided requests to join particular community groups. For example, former classmates may choose to join a community group called "class of 2000." In addition, subscribers to an IPTV service may choose to be members of "Republicans," "Democrats," or "Independents," as examples of other community groups. Operation 304 may also relate to an operation for assigning community groups to members based on data stored in profiles. For example, when setting up a user profile, a member may enter age, religion, and other information that may be automatically scanned when deciding from which members to collect appropriateness data. In addition, systems may automatically retrieve grouping data in other ways. For example, a user may wish to receive appropriateness data from every subscriber or non-subscribing user of a service provider network that watched a particular movie. An embodied system carrying out operation 304 may then scan user logs, order histories, or user profiles to determine the pool of persons to be used in assembling a community group.

As shown, operation 306 relates to receiving from a user a selection for the multimedia program from the EPG. Selection for the multimedia program may occur in various ways including a user scrolling down an EPG to display the title of the multimedia program. Operation 308 relates to presenting an appropriateness indicator to the user in response to the selection from the EPG. In accordance with disclosed methods, the appropriateness indicator is based on the appropriateness data collected from community group members. Example appropriateness indicators include but are not limited to non-numeric graphical indicators, calculated averages of ratings from a plurality of community group members, numerical indicators in conjunction with graphical symbols, comparisons against the appropriateness indicators of other multimedia programs, percentile ratings that compare the multimedia program to a plurality of other multimedia programs, and color-based indicators in which different colors or shades indicate degrees of appropriateness. The method may further include receiving a request from the user to be associated with particular community groups.

Figure 4:
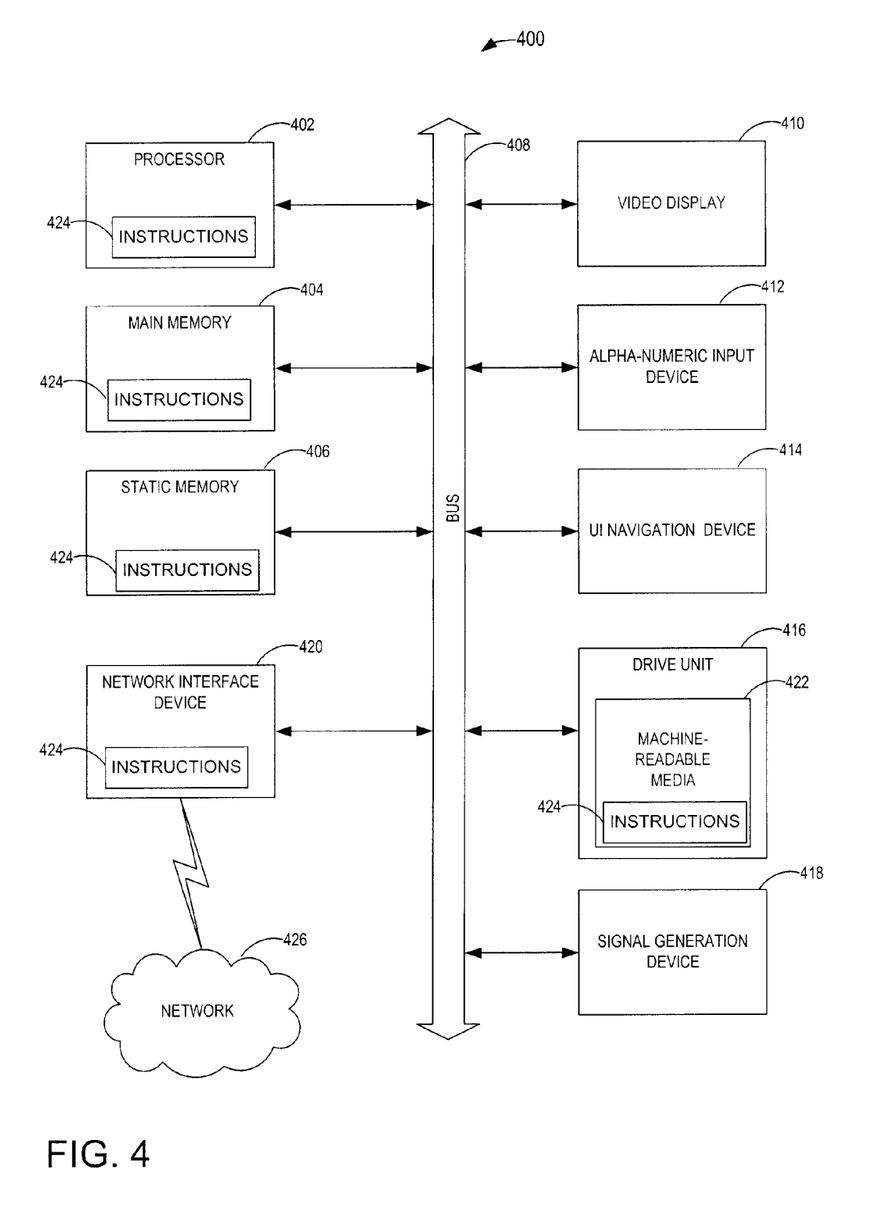
FIG. 4 depicts an example data processing system that may be enabled in accordance with disclosed embodiments to collect and distribute information related to the appropriateness of multimedia programs.

FIG. 4 illustrates in block diagram form a data processing system 400 within which a set of instructions may operate to perform one or more of the methodologies discussed herein. Data processing system 400 may operate as a standalone device or may be connected (e.g., networked) to other data processing systems. In a networked deployment, data processing system 400 may operate in the capacity of a server or a client data processing system in a server-client network environment, or as a peer computer in a peer-to-peer (or distributed) network environment. Example data processing systems include, but are not limited to a digital video recorder, a personal computer (PC), a tablet PC, set-top box, a cable box, a satellite box, an EPG box, a personal data assistant, a cellular telephone, a smart phone, a web appliance, a network router, a switch, a bridge, a server, or any machine capable of executing a set of instructions (sequential or otherwise) that specify actions to be taken by that machine. Further, while only a single data processing system is illustrated, the term "data processing system" shall also be taken to include any collection of data processing systems that individually or jointly execute a set (or multiple sets) of instructions to perform any one or more of the methodologies discussed herein.

As shown, data processing system 400 includes a processor 402 (e.g., a central processing unit, a graphics processing unit, or both), a main memory 404, and a static memory 406 that may communicate with each other via a bus 408. In some embodiments, the main memory 404 and/or the static memory 406 may be used to store the indicators or values that relate to multimedia content accessed or requested by a consumer. Data processing system 400 may further include a video display unit 410 (e.g., a television, a liquid crystal display or a cathode ray tube) on which to display multimedia content such as pay-per-view sporting events, television programs, video-on-demand movies, and the like. Data processing system 400 also includes an alphanumeric input device 412 (e.g., a keyboard or a remote control), a user interface (UI) navigation device 414 (e.g., a remote control or a mouse), a disk drive unit 416, a signal generation device 418 (e.g., a speaker) and a network interface device 420. The input device 412 and/or the UI navigation device 414 (e.g., the remote control) may include a processor (not shown), and a memory (not shown). The disk drive unit 416 includes a machine-readable medium 422 that may have stored thereon one or more sets of instructions and data structures (e.g., instructions 424) embodying or utilized by any one or more of the methodologies or functions described herein. The instructions 424 may also reside, completely or at least partially, within the main memory 404, within static memory 406, within network interface device 420, and/or within the processor 402 during execution thereof by the data processing system 400.

The instructions 424 may further be transmitted or received over a network 426 (e.g., a content provider) via the network interface device 420 utilizing any one of a number of transfer protocols (e.g., broadcast transmissions, HTTP). While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine (i.e., data processing system) and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the disclosed systems may be described in connection with one or more embodiments, it is not intended to limit the subject matter of the claims to the particular forms set forth. On the contrary, disclosed systems are intended to include alternatives, modifications and equivalents as may be included within the spirit and scope of the subject matter as defined by the appended claims. For example, although disclosed embodiments may be described in terms of STBs, it should be noted that disclosed embodiments may incorporate such functionality into data processing systems, displays, televisions, or monitors that do not have physical characteristics, for example, of traditional converter boxes that may have been operated from atop a television, as the name "set-top box" may otherwise suggest.

What is claimed is:

1. A method for rating multimedia content, the method comprising:
   accessing first category rating data indicating ratings, of a plurality of group members associated with a group, with respect to a first category and a first multimedia program, wherein the first category is associated with a characteristic of the first multimedia program;
   determining, based on the first category ratings data, a first category group rating for the multimedia program;
   determining a percentile of the first category group rating, wherein the percentile indicates a percentage of other first category group ratings, determined by the group for other multimedia programs, having a rating that is lower than the first category group rating; and
   providing to a user, by an application server, the percentile of the group rating.

2. The method of claim 1, wherein the user is a member of the group.

3. The method of claim 1, wherein the first category rating data includes sub-portion rating data corresponding to sub-portions of the first multimedia program.

4. The method of claim 1, wherein the first category group rating indicates an average rating of the first category rating data.

5. The method of claim 1, wherein the first category is selected from: humor, violence, language aspect, and sexual content.

6. The method of claim 1, wherein the first category includes an earliest age for viewing category.

7. A non-transitory computer readable media storing processor-executable program instructions, wherein the program instructions, when executed by the processor, cause the processor to perform a method for rating multimedia content, the method comprising:
   accessing first category rating data indicating ratings, of a plurality of group members associated with a group, with respect to a first category and a first multimedia program, wherein the first category is associated with a characteristic of the first multimedia program;
   determining, based on the first category ratings data, a first category group rating for the multimedia program;
   determining a percentile of the first category group rating, wherein the percentile indicates a percentage of other first category group ratings, determined by the group for other multimedia programs, having a rating that is lower than the first category group rating; and
   providing to a user the percentile of the first category group rating.

8. The computer readable media of claim 7, wherein the method includes:
   receiving a request from the user to be associated with the group.

9. The computer readable media of claim 7, wherein the first category group rating indicates an average of the rating data collected from the plurality of group members.

10. The computer readable media of claim 7, wherein the first category is selected from: humor, violence, language, and sexual content.

11. The computer readable media of claim 7, wherein the first category includes an earliest viewing age.

12. The computer readable media of claim 7, wherein a color of the indicator indicates a degree of appropriateness.

13. The computer readable media of claim 7, wherein the rating data includes ratings for a sub-portion of the first multimedia program.

14. An application server including a processor and computer readable storage, accessible to the processor, storing program instructions, wherein the program instructions, when executed by the processor cause the processor to perform operations comprising:
   accessing first category rating data indicating ratings, of a plurality of group members associated with a group, with respect to a first category and a first multimedia program, wherein the first category is associated with a characteristic of the first multimedia program;
   determining, based on the first category ratings data, a first category group rating for the multimedia program;
   determining a percentile of the first category group rating, wherein the percentile indicates a percentage of other first category group ratings, determined by the group for other multimedia programs, having a rating that is lower than the first category group rating; and
   display the percentile of the first category group rating.

15. The application server of claim 14, wherein the operations include:
   receiving, from the user, a request to be associated with the group.

16. The application server of claim 14, wherein the operations include:
   scanning a plurality of individual profiles; and
   defining the group based on a portion of the plurality of individual profiles.

17. The application server of claim 16, wherein the operations include:
   collecting demographic data from the plurality of individual profiles for use in defining the group.

* * * * *